US012723375B2

(12) United States Patent
Baughman et al.

(10) Patent No.: US 12,723,375 B2
(45) Date of Patent: Sep. 1, 2026

(54) PREVENTING ACCIDENTS BY ANALYZING AND BALANCING MATERIAL PILES IN INDUSTRIAL TRANSPORTATION

(71) Applicant: International Business Machines Corporation, Armonk, NY (US)

(72) Inventors: Aaron Keith Baughman, Cary, NC (US); Jessica Nahulan, Vaughan (CA); Sarbajit Kumar Rakshit, Kolkata (IN); Carolina Garcia Delgado, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 18/958,008

(22) Filed: Nov. 25, 2024

(65) Prior Publication Data

US 2026/0152926 A1 Jun. 4, 2026

(51) Int. Cl.
*E02F 9/26* (2006.01)
*E02F 3/43* (2006.01)
*G05D 1/246* (2024.01)

(52) U.S. Cl.
CPC ................ *E02F 9/26* (2013.01); *E02F 3/434* (2013.01); *E02F 3/439* (2013.01); *E02F 9/261* (2013.01); *G05D 1/2465* (2024.01)

(58) Field of Classification Search
CPC ... E02F 3/434; E02F 9/26; E02F 9/261; E02F 3/439; G05D 1/2465
See application file for complete search history.

(56) References Cited

U.S. PATENT DOCUMENTS 6,986,294 B2 1/2006 Fromme et al.
8,903,689 B2 12/2014 Dunbabin et al.

(Continued)

FOREIGN PATENT DOCUMENTS

CN 113625299 A 11/2021
CN 116736331 A 9/2023
CN 117329971 A 1/2024

OTHER PUBLICATIONS

Yao et al., Deep learning-based prediction of piled-up status and payload distribution of bulk material, Oct. 19, 2020, Elsevier, Automation in Construction 121 (2021), pp. 1-17 (Year: 2020).*
Melenbrink et al., Autonomous Sheet Pile Driving Robots for Soil Stabilization, May 20-24, 2019, 2019 International Conference on Robotics and Automation (ICRA), pp. 339-345 (Year: 2019).*
Cassidy et al., "Void Detection Beneath Reinforced Concrete Sections The Practical Application of Ground-Penetrating Radar and Ultrasonic Techniques" Journal of Applied Geophysics, Jun. 2011, 14 pages.

(Continued)

*Primary Examiner* — Sze-Hon Kong
(74) *Attorney, Agent, or Firm* — CANTOR COLBURN LLP; Joseph P. Curcuru

(57) ABSTRACT

A system includes a scanning module, a force distribution module, and an unbalance prediction module. The scanning module generates a 3D model of a pile of material during a loading process and continuously updates the 3D model as at least one additional layer of material is added. The force distribution module compares the 3D model prior to depositing the at least one additional layer to the 3D model after depositing the at least one additional layer identifies at least one void space in the pile of material. The force distribution module further determines at least one force vector having a respective magnitude corresponding to the pile of material. The unbalance prediction module determines an unbalanced state of the pile of material based on the least one force vector and the at least one void space, and performs a corrective action on the pile of material that removes the unbalanced state.

20 Claims, 9 Drawing Sheets

(56) References Cited

U.S. PATENT DOCUMENTS

| | | | | |
|---|---|---|---|---|
| 9,702,115 | B1 * | 7/2017 | Darukhanavala | E02F 9/205 |
| 11,946,211 | B1 * | 4/2024 | Van Bergen | E01C 3/00 |
| 12,180,670 | B1 * | 12/2024 | Guolla | E02D 7/16 |
| 12,291,834 | B1 * | 5/2025 | Ready-Campbell | E02D 1/02 |
| 2007/0131438 | A1 * | 6/2007 | Brandt | E02F 9/2203<br>172/464 |
| 2017/0002540 | A1 * | 1/2017 | Fletcher | E02F 9/2029 |
| 2018/0347154 | A1 * | 12/2018 | Martinsson | E02F 3/431 |
| 2023/0311903 | A1 * | 10/2023 | Nagel | B60W 10/30<br>701/41 |
| 2023/0383500 | A1 * | 11/2023 | Noda | E02F 3/435 |
| 2024/0209586 | A1 * | 6/2024 | Ready-Campbell | E02D 7/14 |
| 2025/0107484 | A1 * | 4/2025 | Vande Haar | A01D 41/1217 |
| 2025/0341073 | A1 * | 11/2025 | Ready-Campbell | E02D 7/16 |
| 2025/0391210 | A1 * | 12/2025 | Fritz | E01C 23/088 |

OTHER PUBLICATIONS

Nehruji, “Evaluation of 3D Laser Scanning for Volume Calculations” Conserve, Mar. 10, 2020, 11 pages.

Roth et al., “Reliability of void detection in structural ceramics using scanning laser acoustic microscopy”, NASA Technical Memorandum 87035. Retrieved from https://ntrs.nasa.gov/api/citations/19850024024/downloads/19850024024.pdf, Mar. 11-14, 1985, 55 pages.

Wang et al., “Volume Calculation Methods of Irregular Stone Artifacts Based on 3D Laser Scanning Technology” Journal of Asian Architecture and Building Engineering, Mar. 16, 2023, 18 pages.

Wikipedia, “Haul Truck”, Wikipedia, the free encyclopedia, accessed on Feb. 20, 2025, 3 pages, https://en.wikipedia.org/wiki/Haul_truck.pdf.

* cited by examiner

PREVENTING ACCIDENTS BY ANALYZING AND BALANCING MATERIAL PILES IN INDUSTRIAL TRANSPORTATION

BACKGROUND

The present invention generally relates to industrial systems, and more specifically, to computer systems, computer-implemented methods, and computer program products configured to prevent accidents by analyzing and balancing material piles in industrial transportation.

Haul trucks are large, off-highway, rigid dump trucks specifically engineered for use in high-production mining and heavy-duty construction environments. Haul trucks are also used for transporting construction equipment from job site to job site. Some are multi-axle in order to support the equipment or load that is being hauled. The loads transported by haul trucks are typically massive, large quantity loads such as, for example, rock, dirt, gravel, bricks, ore, or other quarried materials. The weight of the loads can range from about 40 tons to 400 tons. The substantial weight and irregular shapes of the load elements (e.g., individual rocks) can lead to weight imbalances and void spaces within the volume of the load.

SUMMARY

According to a non-limiting embodiment, a material pile balance analysis and correction system includes a scanning module, a force distribution module, and an unbalance prediction module. The scanning module generates a 3D model of a pile of material during a loading process and continuously updates the 3D model as at least one additional layer of material is added. The force distribution module compares the 3D model prior to depositing the at least one additional layer to the 3D model after depositing the at least one additional layer identifies at least one void space in the pile of material. The force distribution module further determines at least one force vector having a respective magnitude corresponding to the pile of material. The unbalance prediction module determines an unbalanced state of the pile of material based on the least one force vector and the at least one void space, and performs a corrective action on the pile of material that removes the unbalanced state.

In addition to one or more of the features described above, or as an alternative to any of the foregoing embodiments, determining at least one individual force vector (Wx) comprises converting the 3D model into a mesh model including a plurality of pixels that define the pile of material, and determining the at least one individual force vector (Wx) corresponding to one or more pixels among the plurality of pixels.

In addition to one or more of the features described above, or as an alternative to any of the foregoing embodiments, the at least one corrective action includes rearranging the pile of material to remove the at least one void space.

In addition to one or more of the features described above, or as an alternative to any of the foregoing embodiments, rearranging the pile of material includes rearranging a most recent deposited layer of material to remove the at least one void.

In addition to one or more of the features described above, or as an alternative to any of the foregoing embodiments, the at least one corrective action includes controlling a robotic equipment to rearrange the pile of material.

In addition to one or more of the features described above, or as an alternative to any of the foregoing embodiments, determining the at least one force vector includes calculating a resisting force (R) and a driving force (S), and determining the unbalanced state includes comparing the resisting force (R) to the driving force (S).

In addition to one or more of the features described above, or as an alternative to any of the foregoing embodiments, the unbalanced state is determined in response to the resisting force (R) is less than the driving force (S).

According to another non-limiting embodiment, a method comprises generating a three-dimensional (3D) model of a pile of material during a loading process and continuously updating the 3D model as at least one additional layer of material is added to the pile of material. The method further comprises comparing the 3D model prior to depositing the at least one additional layer to the 3D model after depositing the at least one additional layer to identify at least one void space in the pile of material. The method further comprises determining at least one force vector having a respective magnitude corresponding to the pile of material, and determining an unbalanced state of the pile of material based on the least one force vector and the at least one void space. The method further comprises performing a corrective action on the pile of material that removes the unbalanced state.

In addition to one or more of the features described above, or as an alternative to any of the foregoing embodiments, determining at least one individual force vector (Wx) comprises converting the 3D model into a mesh model including a plurality of pixels that define the pile of material, and determining the at least one individual force vector (Wx) corresponding to one or more pixels among the plurality of pixels.

In addition to one or more of the features described above, or as an alternative to any of the foregoing embodiments, the at least one corrective action includes rearranging the pile of material to remove the at least one void space.

In addition to one or more of the features described above, or as an alternative to any of the foregoing embodiments, rearranging the pile of material includes rearranging a most recent deposited layer of material to remove the at least one void.

In addition to one or more of the features described above, or as an alternative to any of the foregoing embodiments, the at least one corrective action includes controlling a robotic equipment to rearrange the pile of material.

In addition to one or more of the features described above, or as an alternative to any of the foregoing embodiments, determining the at least one force vector includes calculating a resisting force (R) and a driving force (S), and determining the unbalanced state includes comparing the resisting force (R) to the driving force (S).

In addition to one or more of the features described above, or as an alternative to any of the foregoing embodiments, the unbalanced state is determined in response to the resisting force (R) is less than the driving force (S).

According to yet another non-limiting embodiment, a computer program product is provided to control a computer system to detect void spaces in a pile of material and estimate the unbalanced forces caused by the void spaces. The computer program product comprises a computer readable storage medium having program instructions embodied therewith. The program instructions are executable by an electronic computer processor to control the computer system to perform operations comprising generating a three-dimensional (3D) model of a pile of material during a loading process and continuously updating the 3D model as at least one additional layer of material is added to the pile of material, and comparing the 3D model prior to depositing the at least one additional layer to the 3D model after depositing the at least one additional layer to identify at least one void space in the pile of material. The operations further includes determining at least one force vector having a respective magnitude corresponding to the pile of material, and determining an unbalanced state of the pile of material based on the least one force vector and the at least one void space. The operations further includes performing a corrective action on the pile of material that removes the unbalanced state.

In addition to one or more of the features described above, or as an alternative to any of the foregoing embodiments, determining at least one individual force vector (Wx) comprises converting the 3D model into a mesh model including a plurality of pixels that define the pile of material, and determining the at least one individual force vector (Wx) corresponding to one or more pixels among the plurality of pixels.

In addition to one or more of the features described above, or as an alternative to any of the foregoing embodiments, the at least one corrective action includes rearranging the pile of material to remove the at least one void space.

In addition to one or more of the features described above, or as an alternative to any of the foregoing embodiments, rearranging the pile of material includes rearranging a most recent deposited layer of material to remove the at least one void.

In addition to one or more of the features described above, or as an alternative to any of the foregoing embodiments, the at least one corrective action includes controlling a robotic equipment to rearrange the pile of material.

In addition to one or more of the features described above, or as an alternative to any of the foregoing embodiments, determining the at least one force vector includes calculating a resisting force (R) and a driving force (S), and determining the unbalanced state includes comparing the resisting force (R) to the driving force (S).

In addition to one or more of the features described above, or as an alternative to any of the foregoing embodiments, the unbalanced state is determined in response to the resisting force (R) is less than the driving force (S).

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
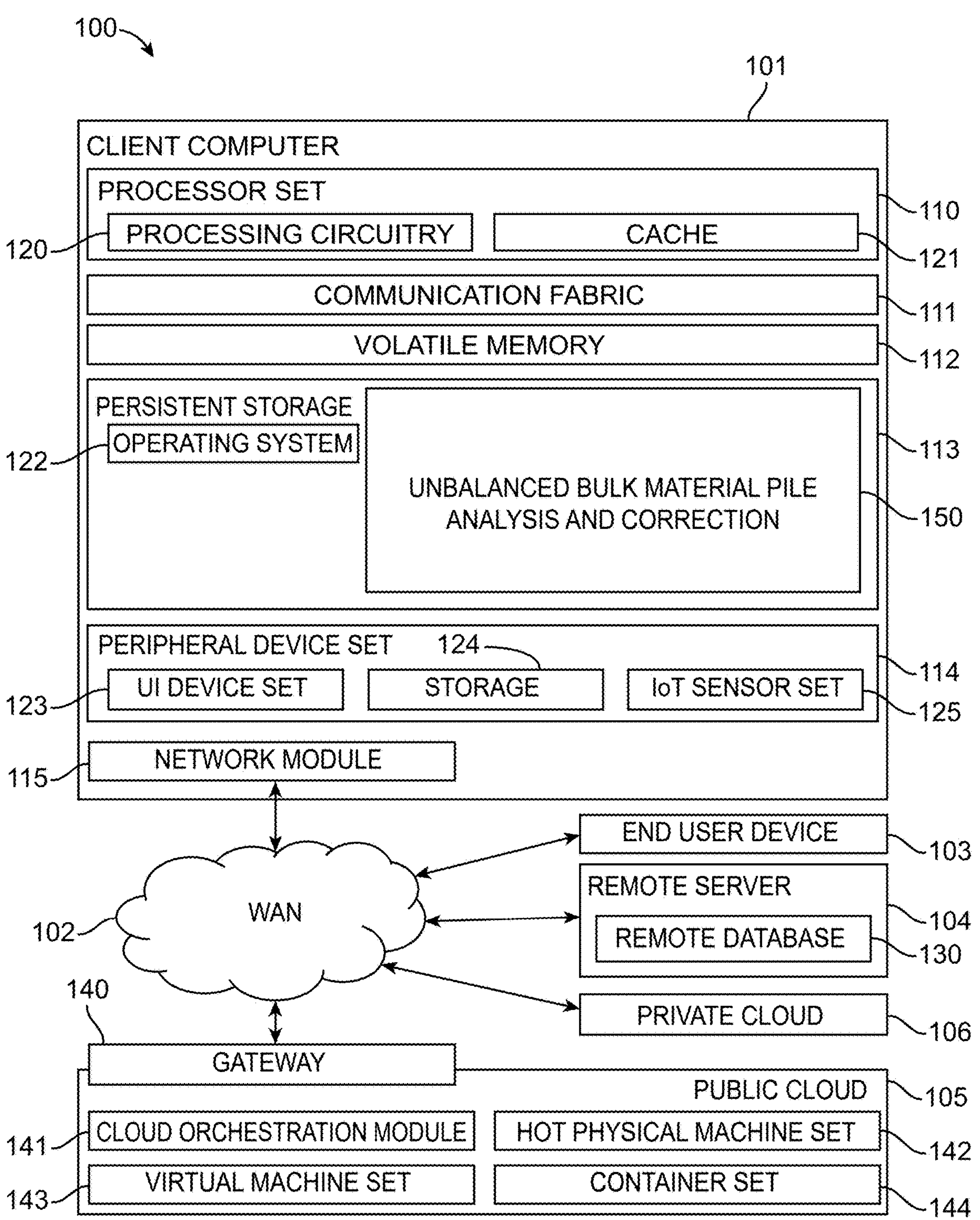
FIG. 1 depicts a block diagram of an example computer system for use in conjunction with one or more embodiments of the present invention.

Void spaces often found in large bulk industrial material piles lead to weight imbalances that create industrial safety concerns. For example, the unbalanced force on the material piles may pose a risk of accidents caused by material pile shifts, or even entire pile collapses. In addition, materials piles that are unbalanced can shift during transportation causing the heavy truck to lose control or completely flip. Conventional safety procedure for transporting large bulk materials using heavy trucks include regular vehicle inspections, load securement (e.g., using straps, tarps, etc.) to prevent material shifting, and weight level regulations. None of these conventional methods, however, take into account the internal void spaces existing within the bulk material pile.

The proposed system utilizes 3D laser scanning and force simulation to detect void spaces and estimate unbalanced forces, rearrange material piles to eliminate void spaces and minimize unbalanced forces, ensure safer transportation, and reduce the risk of accidents caused by imbalances in loaded materials on trucks.

Various non-limiting embodiments of the present disclosure provide a material pile balance analysis and correction system capable of detecting void spaces in a pile of material and estimating the unbalanced forces caused by the void spaces. The material pile balance analysis and correction system is further capable of determining correction actions such as for example, suggested rearrangements of one or more materials layers to eliminate the void spaces and minimize unbalanced forces. In a non-limiting embodiment, the material pile balance analysis and correction system employs three-dimensional (3D) laser scanning system that scans the material pile during material loading (e.g., on a heavy truck) and/or unloading (e.g., from a truck). Based on the scanning results, the material pile balance analysis and correction system compares a 3D model of each progressive layers to estimate presence of void spaces on any layer of a pile of material. Through force component simulation and by considering these void spaces, the proposed system estimates unbalance force on material piles and accordingly then determines if post-deposit corrections or change in material depositing (e.g., dumping) sequence is required.

In another example, the material pile balance analysis and correction system processes a 3D model of a heavy truck's mobility path and determines an allowed level of unbalanced forces on material piles. The material pile balance analysis and correction system performs a force simulation based on shapes, dimensions and/or mass of the material to identify possible void spaces that may form during transportation. The heavy truck can then be subsequently loaded with the material in a manner that is most resilient to the formation of void spaces and unbalanced forces that are expected during transportation of the material pile. Accordingly, the material pile balance analysis and correction system described herein can improve transportation safety and reducing the risk of accidents caused by imbalances in loaded materials.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as performing proactive vehicle aquaplaning mitigation including real-time simulation, speed control, and guidance for enhanced vehicle safety. In addition to the system configured to perform material pile balance analysis and correction 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and a system to perform material pile balance analysis and correction 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Client computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods such as performing material pile balance analysis and correction 150, for example, may be stored in the in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code facilitates the system and method of performing material pile balance analysis and correction 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2A:
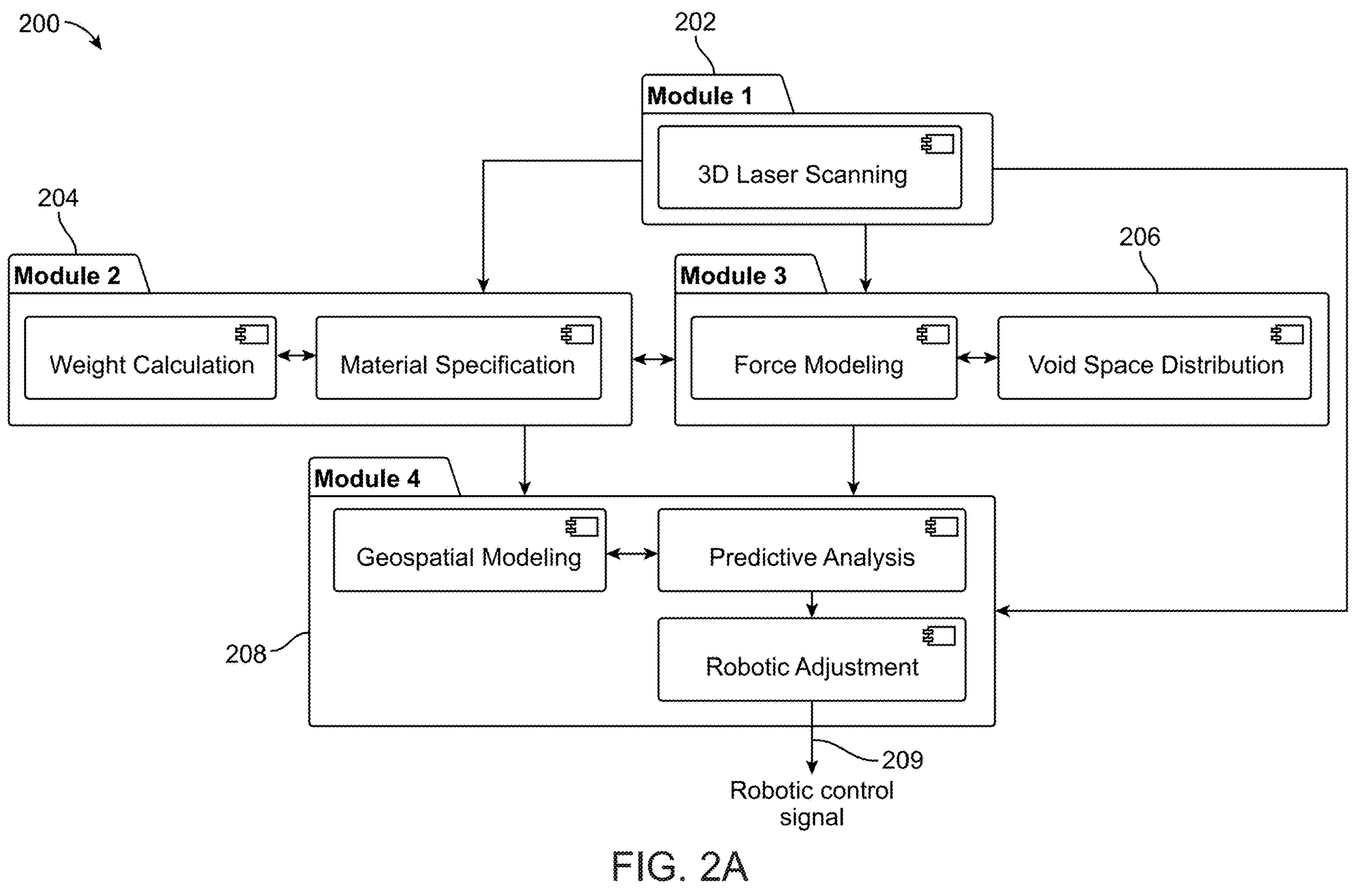
FIG. 2A is a block diagram illustrating a material pile balance analysis and correction system according to a non-limiting embodiment of the present disclosure.

With reference to FIG. 2A, a material pile balance analysis and correction system 200 is illustrated according to a non-limiting embodiment of the present disclosure. The system 200 includes a scanning module 202, a volume calculation module 204, a force distribution module 206, and an unbalance prediction module 208. Any one of the scanning module 202, the volume calculation module 204, the force distribution module 206, and the unbalance prediction module 208 can be constructed as an electronic hardware controller that includes memory and a processor configured to execute algorithms and computer-readable program instructions stored in the memory. In addition, the scanning module 202, the volume calculation module 204, the force distribution module 206, and the unbalance prediction module 208 all be embedded or integrated in a single controller.

The scanning module 202 is configured to perform image scanning on one or more target objects such as, for example, a pile of material. As described herein, the pile of material may refer to an initial material pile which sources material for transportation and/or a transport pile which is the resulting pile of material after depositing layers of material from the material pile onto a transportation device. Although a single scanning module 202 is illustrated, it should be appreciated that additional scanning modules 202 can be implemented in the system 200 without departing from the scope of the invention. In a non-limiting embodiment, the scanning module 202 includes three-dimensional (3D) camera in signal communication with an image processor (not shown). Various types of 3D cameras can be implemented including, but not limited to, a LiDAR camera. The LIDAR camera can be positioned such that a material pile appears in the camera's field of view (FOV). Accordingly, the LiDAR camera can emit laser pulses that reflected of the material pile and return to the LiDAR sensor. The returned signals are then processed by the image processor, allowing the scanning module 202 to create a 3D image 305 of the material pile (see FIG. 2B).

The volume calculation module 204 is in signal communication with the scanning module 202. The volume calculation module 204 determines the properties of the material forming the material pile and calculates the overall weight of the material pile. The properties of the material include, but are not limited to, the type of material, the density of each element or piece of the material, the weight of each element or piece of material, and the internal friction angle (φ) of the material. In a non-limiting embodiment, the volume calculation module 204 includes memory (not shown) that stores the properties for various types of material. For example, the memory can store a first set of properties (e.g., weight and density) for sand, a second set of properties for gravel, a third set of properties for ore, etc. The type of material forming the material pile can then be input to volume calculation module 204 and used to calculate the overall weight of the material pile. Based on the properties and the weight, the volume calculation module 204 calculates the actual volume of material based on density and weight. The actual volume can then be used by the system 200 to determine a presence of void spaces formed during material loading or dumping based on differences between an initial volume of the material pile and a change (e.g., increase) in volume of the material pile as descried in greater detail below.

The force distribution module 206 is in signal communication with the scanning module 202 and the volume calculation module 204. The force distribution module 206 performs a void space analysis to determine the presence of one or more voids (e.g., empty space) in the material pile and determines a space distribution based on material weight, density, and void spaces, taking equilibrium conditions into consideration. In a non-limiting embodiment, the force distribution module 206 compares the 3D model 305 prior to depositing the at least one additional layer to the 3D model 305 after depositing the at least one additional layer to identify at least one void space in the pile of material. Accordingly, the force distribution module 206 uses the results of the void space analysis (e.g., the space distribution) and the 3D image of the material pile to generate a force distribution model. In a non-limiting embodiment, the force distribution module 206 incrementally builds a 3D model of the pile of material, identifies void spaces in different portions of the newly laid material, and actively calculates the force distribution of the material pile as layers of material are added or removed from the material.

In a non-limiting embodiment, the force distribution module 206 can determine individual unbalanced forces applied to the pile of material. The force distribution module 206 converts the 3D image model 305 (see FIG. 2B) provided by the scanning module 202 into a mesh model 307 (See FIG. 2C). The mesh model defines the pile of material 300 as a plurality of 3D cells 309 corresponding 3D respective coordinates (X, Y, Z). Accordingly, the force distribution module 206 can calculate a plurality of individual force components corresponding to each 3D cell 309, which can then be used to determine unbalanced forces realized by the pile of material 300.

The force distribution module 206 can also obtain various parameters stored in memory such as, for example, the weight of the material and the internal friction angle of the material (φ) along with the slope angle (θ) of the pile based on the pile of material captured in the 3D image provided by the scanning module and estimation of external forces that are applied to pile of material (e.g., from historical learning). Accordingly, the force distribution module 206 can calculate a driving force (S) and a resisting force (R), which are force vectors applied to a pile of material. For example, the driving force (S) is the component of gravitational force acting parallel to the slope or potential failure surface and can be calculated as:

$$S = W\sin(\theta), \text{ where:}$$

W=the weight of the material; and

θ is the slope angle of the pile.

The resisting force (R) is the shear strength of the material resisting movement along the potential failure surface and can be calculated as follows:

$$R = N\tan(\varphi), \text{ where:}$$

φ is the internal friction angle of the material; and

N is the normal force (N) perpendicular to the slop, defined as: $N=W\cos(\theta)$ The unbalance prediction module 208 is in signal communication with the scanning module 202, the volume calculation module 204, and the force distribution module 206. The unbalance prediction module 208 can utilize the driving force (S) and the resisting force (R) to define an equilibrium condition used to determine whether the pile of material is balanced or unbalanced. For example, the unbalance prediction module 208 determines the pile of material is balanced when $R \geq S$, and determines the pile of material is unbalanced when $R < S$.

The unbalance prediction module 208 also predicts external forces based on historical learnings, simulates force components force simulations that utilize the calculated force distributions and predicted external force while considering voids to predict unbalance forces. In a non-limiting embodiment, the unbalance prediction module 208 performs geospatial modeling by generating a detailed force distribution "map" of the material pile. The geospatial model provides real-time data indicating load-bearing capacities, weak points and/or unbalances, which can provide active guide adjustments when loading and/or unloading the material pile. Accordingly, the unbalanced prediction module 20 can generate the geospatial model to address unbalanced forces that may arise during transportation, including determining suitable shapes and dimensions for the material piles to be loaded on the transportation vehicle and/or a permissible level of void spaces within the pile.

Figure 2B:
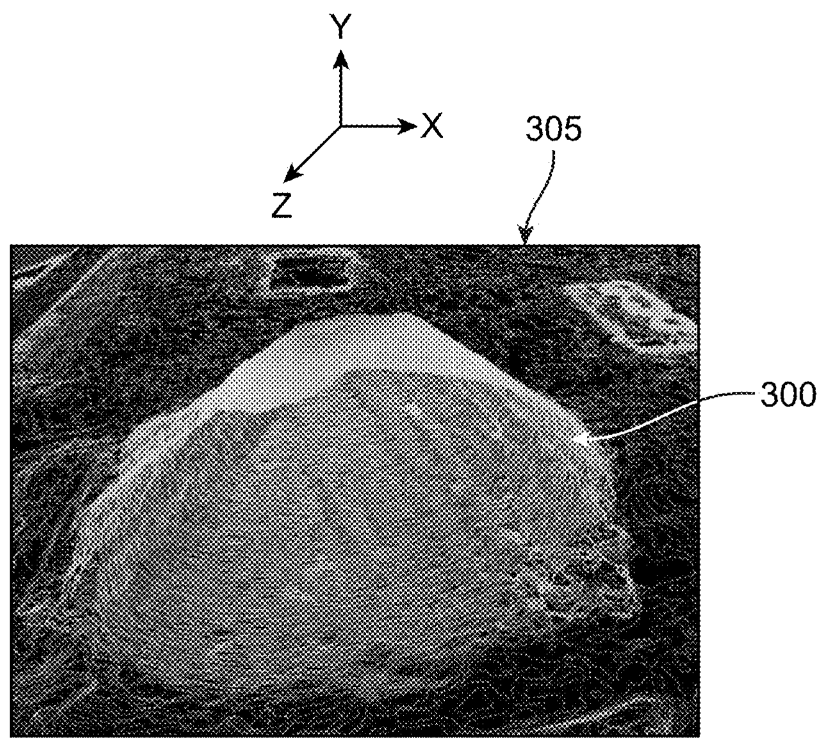
FIG. 2B is a three-dimensional image resulting from a three-dimensional scan operation of a pile of material according to a non-limiting embodiment of the present disclosure.
Figure 2C:
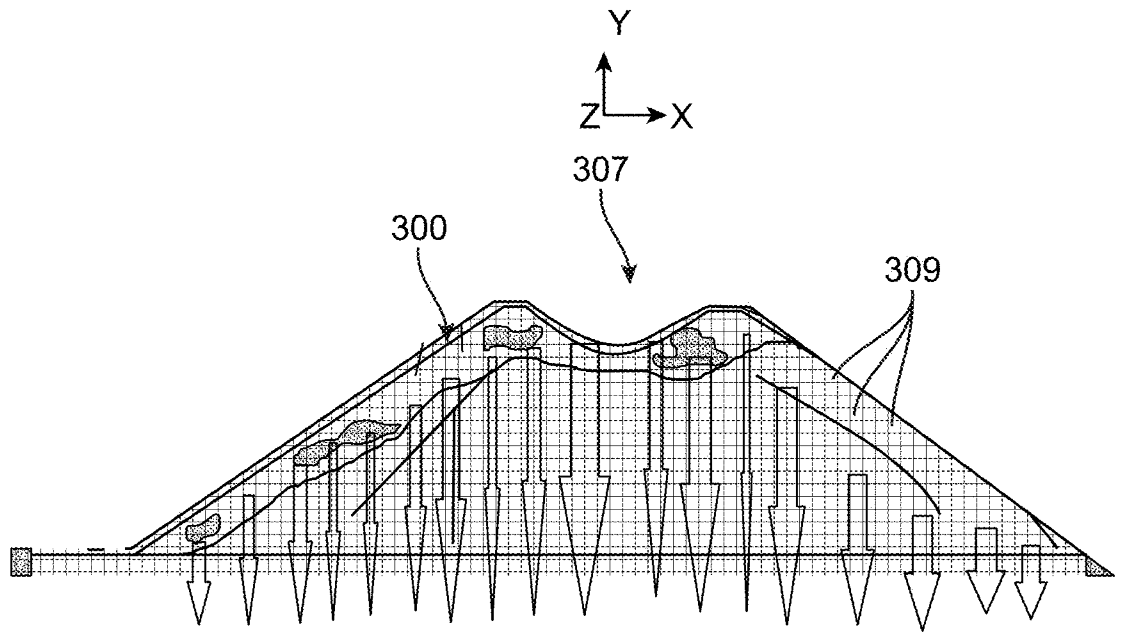
FIG. 2C is a mesh model resulting from a three-dimensional image of a pile of material according to a non-limiting embodiment of the present disclosure.
Figure 2D:
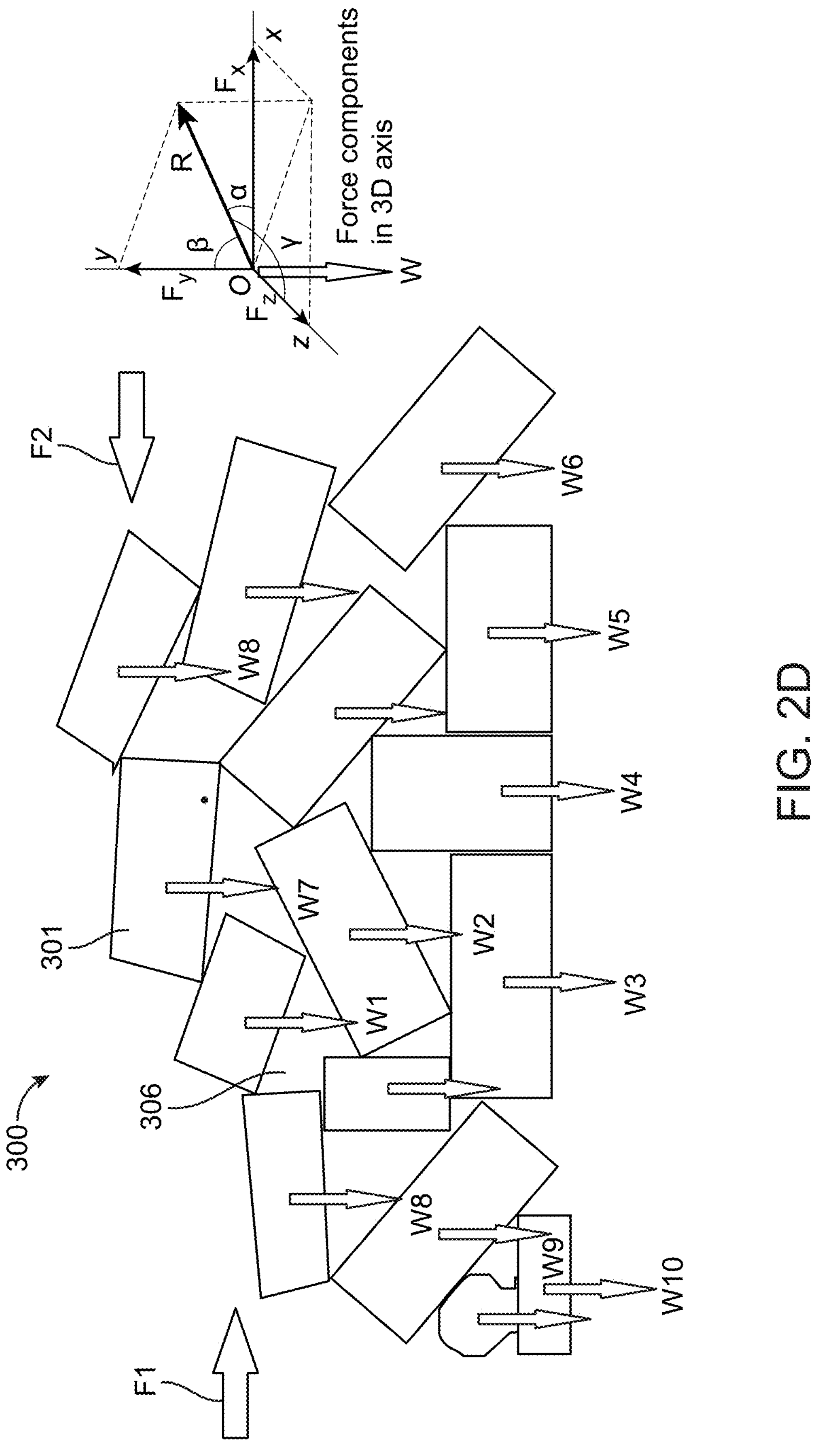
FIG. 2D is a diagram depicting various estimated forces applied to a pile of material according to a non-limiting embodiment of the present disclosure.

In one or more non-limiting embodiments, the geospatial modeling also takes into accounts transportation data and vehicle characteristics associated with transportation vehicles used to transport a pile of material. The transportation data and vehicle characteristics can include, but are not limited to, the mobility path of the vehicle carrying the pile of material, the dimensions of the vehicle, mobility constraints, dumping locations, travel routes, road conditions, and weather conditions during transportation, FIG. 2D depicts various estimated forces applied to a pile of material 300 as predicted by the unbalance prediction module 208 according to a non-limiting embodiment of the present disclosure. The estimated forces include, but are not limited to, individual force vectors (Wx) having a respective magnitude corresponding to corresponding individual material elements 301 forming the pile of the material 300, and external forces (Fx) applied upon the pile of the material 300. Various scenarios may cause external forces Fx to be applied to the pile of material. The external forces Fx can include, but are not limited to, vibrations or jerking movements caused by road conditions and/or vehicles during transportation, wind, collisions, manual handling, etc. When the pile of material 300 is initially deposited (e.g., dumped), the presence of void spaces 306 within the material pile 300 can produce unbalanced forces that may cause collapse of the pile of material 300.

The unbalance prediction module 208 can utilize knowledge of the various estimated forces (e.g., Wx and Fx) to determine corrective actions for removing voids and/or an imbalance of the material pile. In one or more non-limiting embodiments, the unbalance prediction module 208 is in signal communication with one or more robotic systems such as, for example, conveyor belts, heavy construction equipment (e.g., heavy loaders, excavators, backhoes, etc.), and/or other robotic devices, and determines one or more corrective procedures performed by the robotic systems. Accordingly, the unbalance prediction module 208 generates a control signal 209 that adjusts and controls one or more robotic systems to remove the voids and/or imbalance from the material pile.

In a non-limiting embodiment, the unbalance prediction module 208 also determines a 3D model of the transport vehicle (e.g., heavy dump truck). The 3D model takes into account the transport vehicle's mobility path and capability, while also predicting unbalanced forces that may be realized by the material pile during transportation. In this manner, the system 200 can determine how to load the transport vehicle in a manner that will mitigate the occurrence of voids and/or imbalance during transportation and/or can determine corrective actions for removing the voids and/or imbalance of the material when unloading the material from the transport vehicle.

Figure 3A:
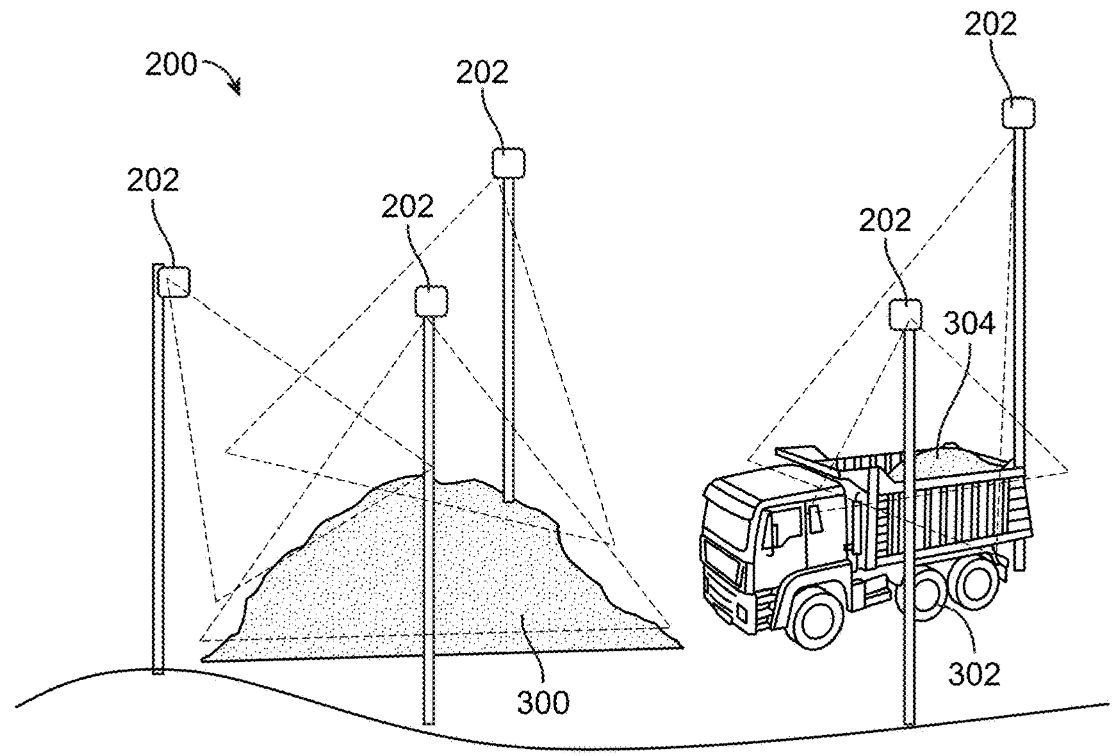
FIG. 3A depicts a three-dimensional scan operation of a first initial pile of material located in a first load area and a second initial pile of material located in a second load area according to a non-limiting embodiment of the present disclosure.
Figure 3B:
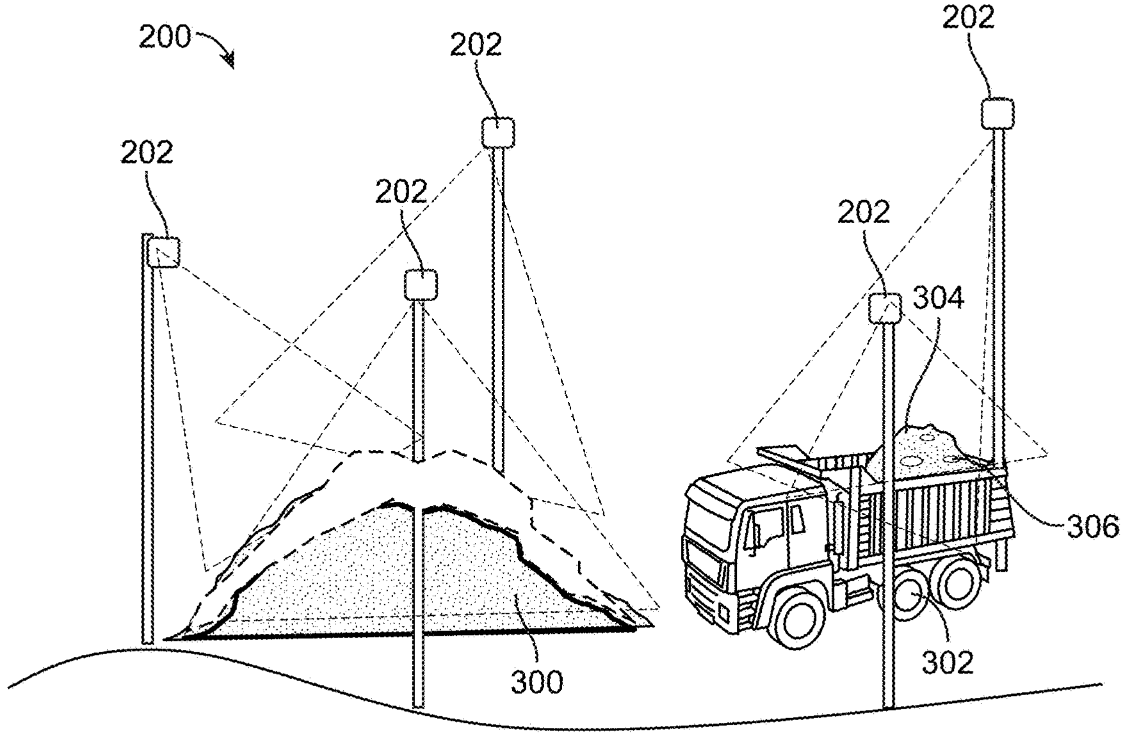
FIG. 3B depicts a three-dimensional scan operation of a first changed pile of material located in the first load area and a second changed pile of material located in the second load area according to a non-limiting embodiment of the present disclosure.

Turning now to FIGS. 3A and 3B, a three-dimensional (3D) laser scanning operation performed by the 200 is illustrated according to a non-limiting embodiment of the present disclosure. Although this example illustrates the 3D laser scanning operation being performed during loading of material from an initial material pile 300 to a transport pile 304 loaded on transport vehicle 302, it should be appreciated that the scanning operation can be performed when unloading a transport pile 304 from a transport vehicle 302 without departing from the scope of the invention.

In this non-limiting embodiment, the material pile balance analysis and correction system 200 includes multiple scanning modules 202 located around the material pile 300 and the transport vehicle 302. As described herein, each of the scanning modules 202 can be implemented as high-resolution LiDAR cameras that generate a 3D image representing a 3D model 305 of an object (e.g., a material pile 300 and/or a transport pile 304) appearing its FOV as shown in FIG. 2B. Each of the scanning modules 202 capture detailed 3D spatial information of each layer of material as it is loaded from the material pile 300 onto the transport vehicle 302 and measures changes in volume during the loading process. According to a non-limiting embodiment, the 3D model 305 is continuously updated during the loading process as layers of material are added or removed to the pile of material 300. In this manner, the system 200 can continuously monitor the removal of material layers from the material pile 300 and the addition of material layers to the transport pile 304 to calculate changes in their respective volume.

The scanning modules 202 capture each layer of material that is removed from the material pile 300 (see FIG. 3A) and loaded onto the transport vehicle 302 (see FIG. 3B). As the material pile 300 decreases and the transport pile 304 increases, the system 200 calculates changes in volume using, for example, various differential computations. By capturing incremental volume changes in the material pile 300 and/or the transport pile 304 as the material is loaded onto the transport vehicle 302, the system 200 enhances accuracy in monitoring the quantity of the transport pile 304 loaded on the transport vehicle 302. This approach ensures that volume variations are precisely identified and tracked.

As the material is transferred from the material pile 300 to the transport pile 304, the system 200 performs a layer-by-layer comparison using the image scanning (3D laser scanning). Accordingly, the system 200 compares each newly loaded layer of material added to the transport pile 304 with the previous material layer, and actively calculates volume differential created by each additional layer as the transport pile 304 increases in real-time. When depositing the material in different layers, the system 200 can take material properties into account, including average density (e.g., stored in memory of the volume calculation module 204), and calculates the weight of the material. Accordingly, the system 200 can determine the precise weight of lifted material, and continuously calculate the weight of the transport pile 304 as more layers are added and its volume increase during the loading process.

In a non-limiting embodiment, the system 200 determines the material's average density, average weight and/or average size (e.g., prestored in memory) and calculates the actual volume of the material laid in each layer of the transport pile 304. This measurement considers the specific physical properties of the material to provide an accurate representation of volume. As described above, the system 200 utilizes the scanning modules 202 to monitor each layer of material added to the transport pile 304.

During the material loading process, void spaces 306 may form as gaps or air pockets as layers of material are added to the transport pile 304. In a non-limiting embodiment, the system 200 calculates the overall volume decrease in the material pile 300 and the overall increase in the material pile 302. By actively comparing the volume of material pile 302 with the increased volume of the transport pile 304, the system 200 can perform a void space analysis, which determines void spaces 306 created in each newly laid layer of material added to the transport pile 304.

As descried herein, the system 200 analyzes the distribution of void spaces 306 that may develop when depositing new layers of material and can assess the potential unbalance forces in a pile of material (e.g., transport pile 304) as new layers of material are added. According to a non-limiting embodiment, the system 200 utilizes the 3D image 305 produced by the scanning modules 202 to identify each deposited layer and identify void spaces 306 that are present in each newly added portion of the layer. In this manner, the system 200 can distinguish between portions of the pile of material (e.g., material pile 300 and/or transport pile 304) occupied by material and portions that contain a void space 306. By analyzing these distinctions, the system 200 can determine a spatial distribution of void spaces within each layer.

The system 200 also creates a force distribution model for pile of material (e.g., the material pile 300 and/or the transport pile 304) recognizing that sections filled with material exert force while void spaces do not. This model reveals the structural impact of material placement and void spaces within each layer and allows the system 200 to perform weight distribution analysis. The weight distribution analysis includes performing an estimate of the weight distribution across each layer based on the identified void spaces in the pile of material. Using weight distribution across various layer sections, the system models force components generated by the deposited material. This modeling provides insights into how material weight impacts different areas within the pile of material.

The force distribution model can also be used to simulate force components applied to a pile of material. For example, the system 200 can simulate force components across different layer portions of the transport pile 304 by calculating equilibrium conditions to assess whether forces are balanced or unbalanced. By identifying void spaces within each layer added to the transport pile 304, the system 200 can detect any unbalanced forces that could compromise pile stability.

Figure 4:
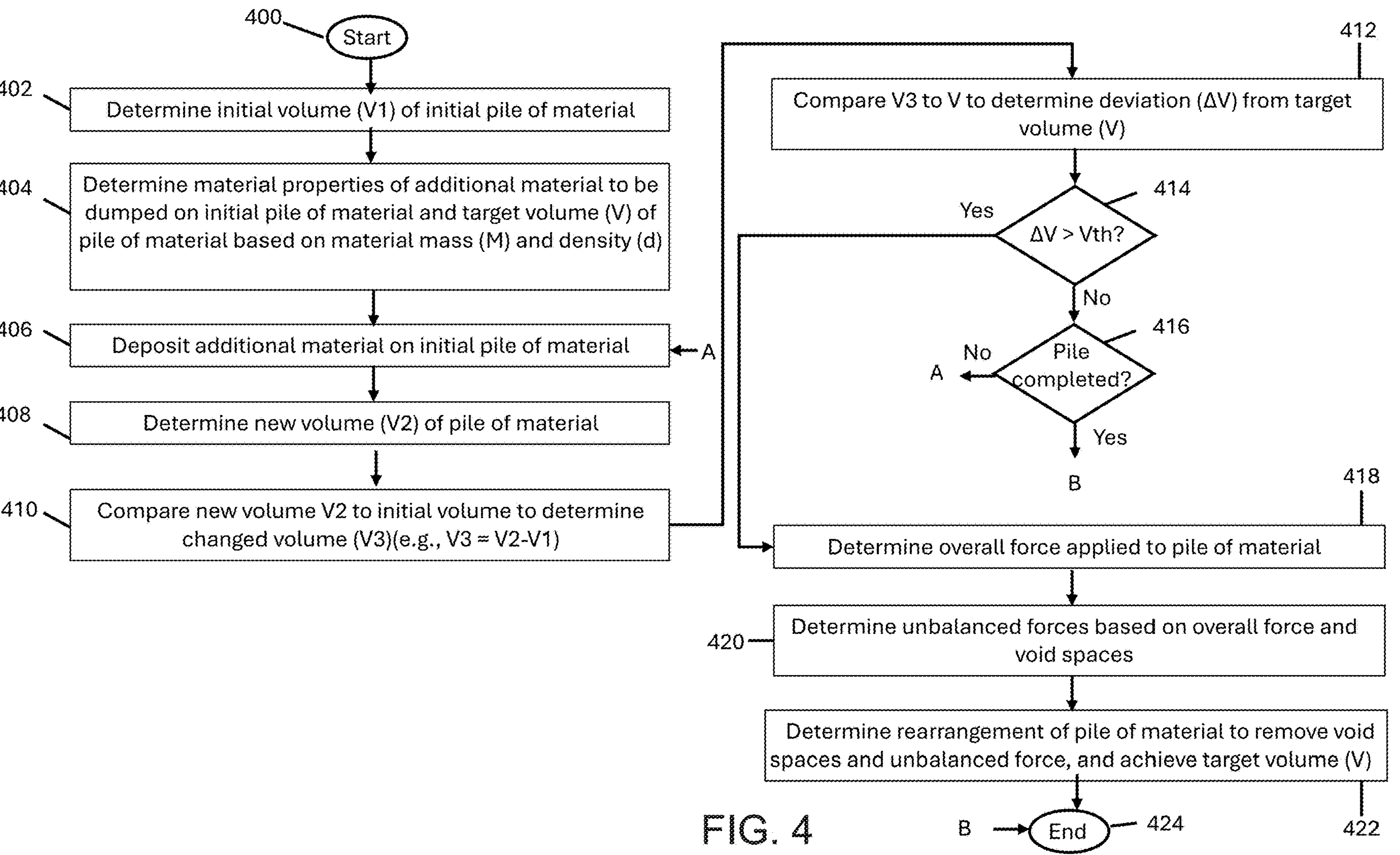
FIG. 4 is a flow diagram illustrating a method of performing material pile balance analysis and correction according to a non-limiting embodiment of the present disclosure.

Turning now to FIG. 4, a method of performing material pile balance analysis and correction according to a non-limiting embodiment of the present disclosure. The method begins at operation 400 and determines an initial volume (V1) of an initial pile of material at operation 402. At operation 404, material properties of additional material to be deposited on initial pile of material are determined. The properties can include, for example, material mass (M) and density (d), which are stored and can be retrieved from memory. A target volume (V) of pile of material is also determined based on the material mass (M) and density (d). The target volume (V) can be a pre-tested value that is stored in memory and indicates that the pile of material excludes voids or has a number of voids that are below a threshold value. In a non-limiting embodiment, the target value can be calculated as: $V=M/d$ At operation 406, additional material is deposited on the initial pile of material and a new volume (V2) of the pile of material (i.e., after depositing the additional material) is determined at operation 408. At operation 410, the new volume (V2) is compared to the initial volume (V1) to determine a changed volume (V3). For example, the changed volume can be calculated as: $V3=V2-V1$. At operation 412, the changed volume (V3) is compared to the target volume (V) of the material to determine a deviation ($\Delta V$)

from the target volume (V), and the deviation (ΔV) is compared to a volume threshold (Vth). When the deviation (ΔV) is not greater than the volume threshold (Vth), the system determines whether loading of the material pile is completed at operation 416. When the material pile is completed, the method ends at operation 424. Otherwise, the method returns to operation 406 and continues analyzing additional layers deposited on the material pile.

When the deviation (ΔV) is greater than the volume threshold (Vth) at operation 414, it is determined that one or more undesirable void spaces are present in the material pile, e.g., formed when depositing an additional layer of material on the material pile. At operation 418, an overall force applied to pile of material is determined and at operation 420 unbalanced forces applied to the material pile are determined based on the overall forces and the void spaces. At operation 422, a rearrangement of the material pile to remove the void spaces and unbalance forces to achieve the target volume (V), and the method ends at operation 424.

Figure 5:
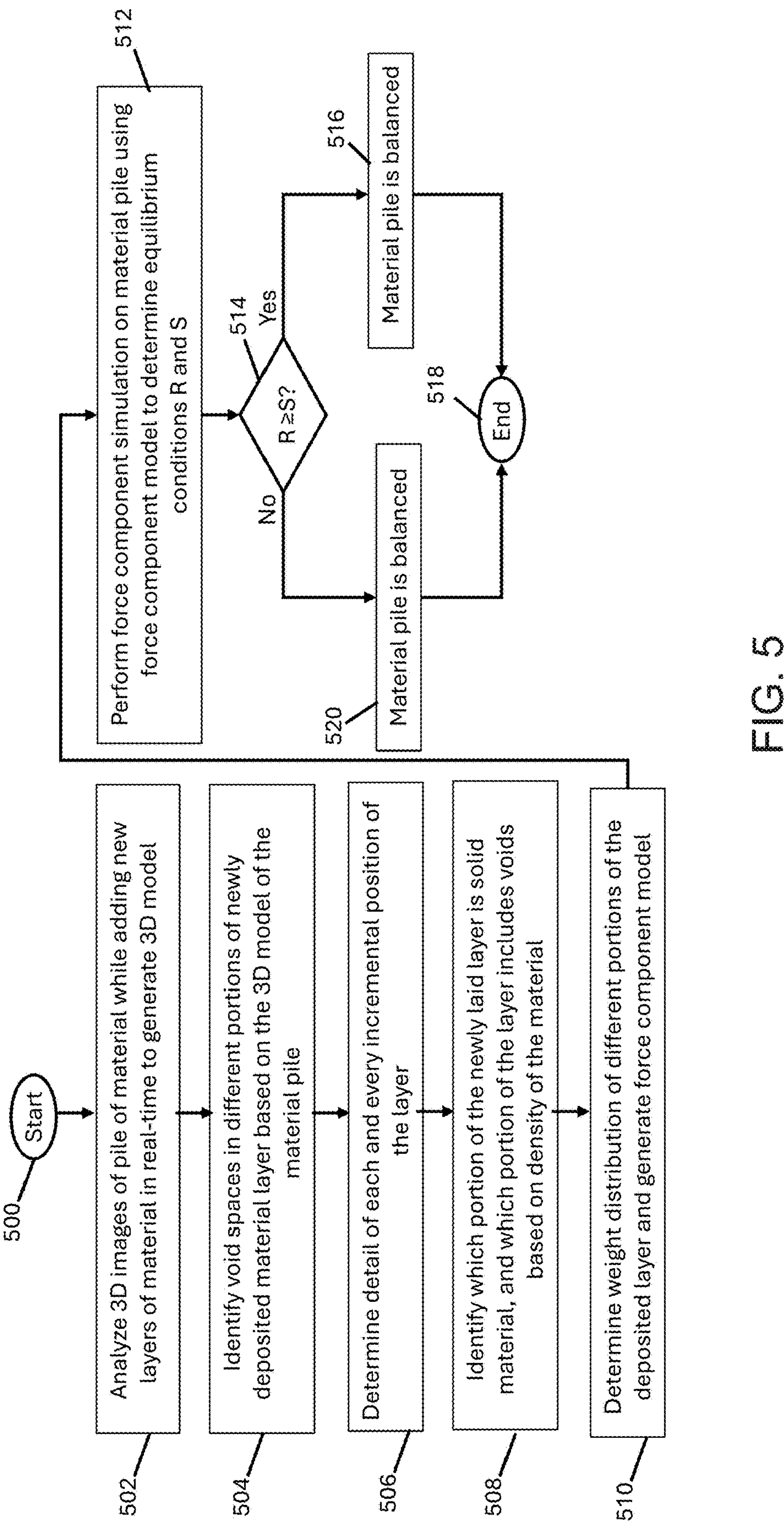
FIG. 5 is a flow diagram illustrating a method of determining whether a pile of material is balance or unbalanced according to a non-limiting embodiment of the present disclosure.

Referring to FIG. 5, a method of determining whether a pile of material is balance or unbalanced is illustrated according to a non-limiting embodiment of the present disclosure. The method begins at operation 500 and analyzes 3D images of pile of material while adding new layers of material in real-time to generate a 3D model of the pile of material at operation 502. At operation 504, any void spaces in different portions of newly deposited material layer are identified based on the 3D model of the pile of material. At operation 506, details of each and every incremental position of a newly added layer is determined. The incremental positions can be determined, for example, based on changes in the pile of material indicated by the 3D images of the pile of material. At operation 508, the 3D model and the estimated density of the material are utilized to determine which portions of the newly laid layer is solid material, and which portions of the layer include a void space. At operation 510, a weight distribution of different portions of the deposited layer is determined and a force component model is generated based on the weight distribution. At operation 512, a force component simulation is performed on the pile of material using the force component model. In a non-limiting embodiment, the force component simulation determines equilibrium conditions used to determine a state at which the pile of material is balanced. As described herein, the equilibrium conditions include the driving force (S) of the pile of material and the resisting force (R) of the pile of material. At operation 514, the resisting force (R) is compared to the driving force (S). When R≥S, the pile of material is determined to be balanced at operation 516 and the method ends at operation 518. When, however, R<S, the pile of material is determined to be unbalanced at operation 520 and the method ends at operation 518.

Figure 6:
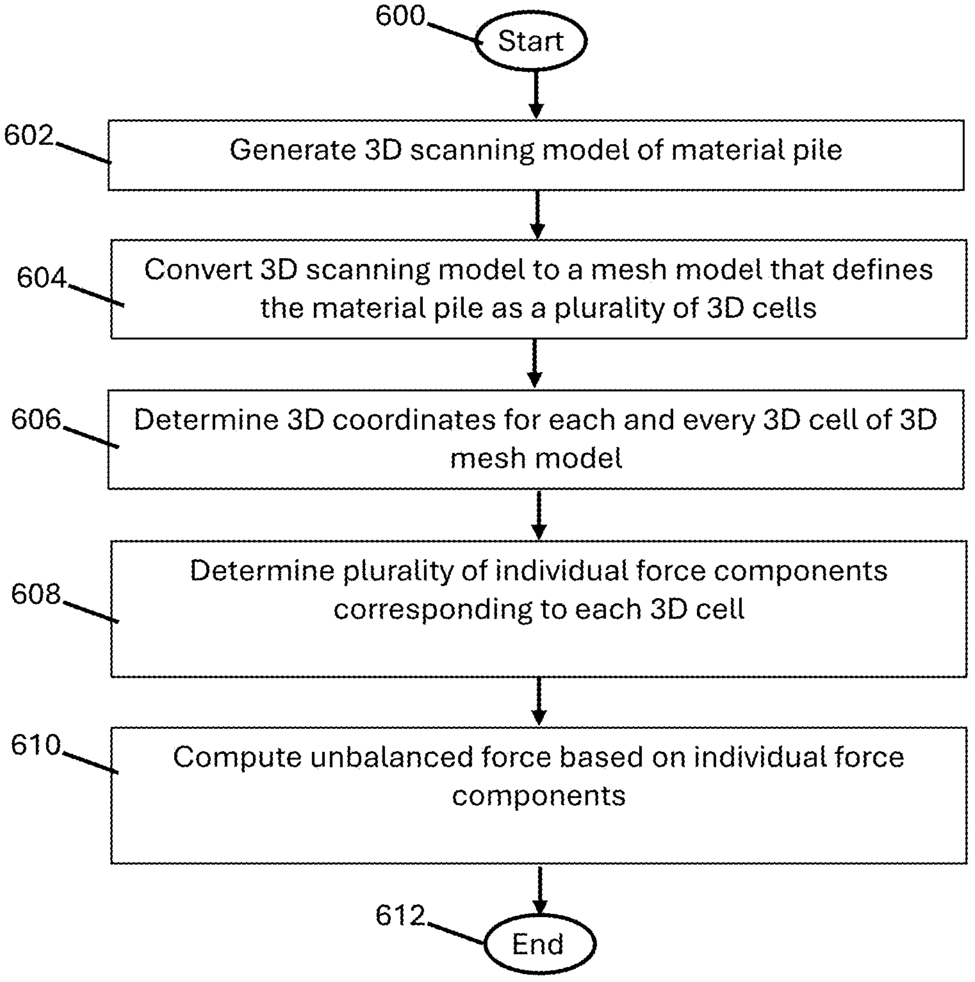
FIG. 6 is a flow diagram illustrating a method of performing a force simulation on a pile of material according to a non-limiting embodiment of the present disclosure.

Turning now to FIG. 6, a method of performing a force simulation on a pile of material is illustrated according to a non-limiting embodiment of the present disclosure. The method begins at operation 600, and a 3D scanning model of pile of material is generated at operation 602. At operation 604, the 3D scanning model is converted into a mesh model that defines the pile of material as a plurality of 3D cells, and corresponding 3D coordinates for each and every 3D cell of 3D mesh model are determined at operation 606. At operation 608, a plurality of individual force components corresponding to each 3D cell are determined. At operation 610, unbalanced forces realized by the pile of material are determined based on the individual force components and the method ends at operation 612.

Figure 7:
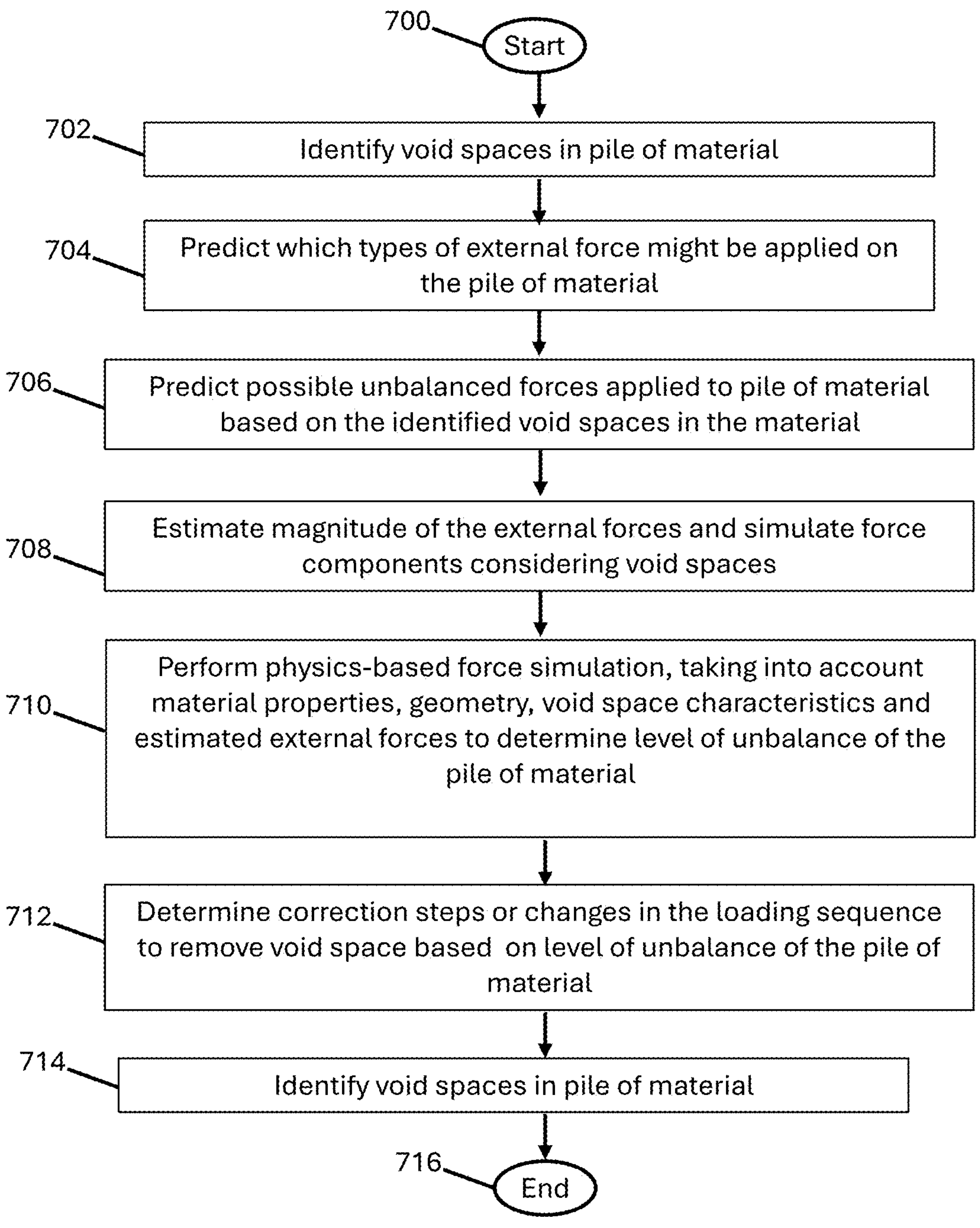
FIG. 7 is a flow diagram illustrating a method of determining a level of unbalance of a pile of material according to a non-limiting embodiment of the present disclosure.

FIG. 7 illustrates a method of determining a level of unbalance of a pile of material according to a non-limiting embodiment of the present disclosure. The method begins at operation 700, and void spaces in the pile of material are determined at operation 702. At operation 704, types of external forces that might be applied on the pile of material (e.g., during transportation) are predicted. At operation 706, possible unbalanced forces applied to pile of material are determined based on the identified void spaces in the material and the external forces. At operation 708, estimated magnitudes of external force components are determined (e.g., obtained from memory) and a corresponding force component simulation of the pile material is performed. At operation 710 a physics-based force simulation is performed that takes into account properties of the material forming the pile of material. The properties include, but are not limited to, geometry the material elements (e.g., sand, gravel, bricks, ore, etc.), void space characteristics, internal friction angle of the material (φ), slope angle (θ) and the estimated external forces to determine a level of unbalance of the pile of material. At operation 712, correction steps or changes in the loading sequence to remove void spaces based are determined based on the level of unbalance. At operation 714, correction actions (e.g., control of robotic equipment) are performed based on the correction steps to remove the void space and balance the pile of material, and the method ends at operation 716.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted or modified. Also, the term “coupled” describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms “comprises,” “comprising,” “includes,” “including,” “has,” “having,” “contains” or “containing,” or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term “exemplary” is used herein to mean “serving as an example, instance or illustration.” Any embodiment or design described herein as “exemplary” is not necessarily to be construed as preferred or advantageous over other embodiments or designs. The terms “at least one” and “one or more” are understood to include any integer number greater than or equal to one, i.e., one, two, three, four, etc. The terms “a plurality” are understood to include any integer number greater than or equal to two, i.e., two, three, four, five, etc. The term “connection” can include both an indirect “connection” and a direct “connection.”

The terms “about,” “substantially,” “approximately,” and variations thereof, are intended to include the degree of error associated with measurement of the particular quantity based upon the equipment available at the time of filing the application. For example, “about” can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over conventional technologies, or to enable others of ordinary skill in the art to understand the embodiments described herein.

What is claimed is:

1. A computer implemented method comprising:

generating a three-dimensional (3D) model of a pile of material during a loading process and continuously updating the 3D model as at least one additional layer of material is added to the pile of material;

comparing the 3D model prior to depositing the at least one additional layer to the 3D model after depositing the at least one additional layer to identify at least one void space in the pile of material;

determining at least one force vector having a respective magnitude corresponding to the pile of material;

determining an unbalanced state of the pile of material based on the least one force vector and the at least one void space; and performing at least one corrective action on the pile of material that removes the unbalanced state.

2. The method of claim 1, wherein determining at least one individual force vector (Wx) comprises:

converting the 3D model into a mesh model including a plurality of pixels that define the pile of material; and determining the at least one individual force vector (Wx) corresponding to one or more pixels among the plurality of pixels.

3. The method of claim 1, wherein the at least one corrective action includes rearranging the pile of material to remove the at least one void space.

4. The method of claim 3, wherein rearranging the pile of material includes rearranging a most recent deposited layer of material to remove the at least one void.

5. The method of claim 4, wherein the at least one corrective action includes controlling a robotic equipment to rearrange the pile of material.

6. The method of claim 1, wherein determining the at least one force vector includes calculating a resisting force (R) and a driving force (S), and determining the unbalanced state includes comparing the resisting force (R) to the driving force (S).

7. The method of claim 6, wherein the unbalanced state is determined in response to the resisting force (R) is less than the driving force (S).

8. A system comprising:

a scanning module configured to generate a three-dimensional (3D) model of a pile of material during a loading process and to continuously update the 3D model as at least one additional layer of material is added to the pile of material;

a force distribution module configured to compare the 3D model prior to depositing the at least one additional layer to the 3D model after depositing the at least one additional layer to identify at least one void space in the pile of material, to determine at least one force vector having a respective magnitude corresponding to the pile of material; and an unbalance prediction module configured to determine an unbalanced state of the pile of material based on the least one force vector and the at least one void space, and to perform at least one corrective action on the pile of material that removes the unbalanced state.

9. The system of claim 8, wherein determining at least one individual force vector (Wx) comprises:

converting the 3D model into a mesh model including a plurality of pixels that define the pile of material; and determining the at least one individual force vector (Wx) corresponding to one or more pixels among the plurality of pixels.

10. The system of claim 8, wherein the unbalance prediction module is in signal communication with at least one robotic system, wherein the at least one corrective action includes rearranging the pile of material to remove the at least one void space.

11. The system of claim 10, wherein rearranging the pile of material includes rearranging a most recent deposited layer of material to remove the at least one void.

12. The system of claim 11, wherein the unbalanced prediction module generates a control signal to control the at least one robotic system to rearrange the pile of material.

13. The system of claim 8, wherein determining the at least one force vector includes calculating a resisting force (R) and a driving force (S), and determining the unbalanced state includes comparing the resisting force (R) to the driving force (S).

14. The system of claim 13, wherein the unbalanced state is determined in response to the resisting force (R) is less than the driving force (S).

15. A computer program product to control a computer system to detect void spaces in a pile of material and estimate the unbalanced forces caused by the void spaces, the computer program product comprising a computer readable storage medium having program instructions embodied therewith, the program instructions executable by an electronic computer processor to control the computer system to perform operations comprising:

generating a three-dimensional (3D) model of a pile of material during a loading process and continuously updating the 3D model as at least one additional layer of material is added to the pile of material;

comparing the 3D model prior to depositing the at least one additional layer to the 3D model after depositing the at least one additional layer to identify at least one void space in the pile of material;

determining at least one force vector having a respective magnitude corresponding to the pile of material;

determining an unbalanced state of the pile of material based on the least one force vector and the at least one void space; and performing at least one corrective action on the pile of material that removes the unbalanced state.

16. The computer program product of claim 15, wherein determining at least one individual force vector (Wx) comprises:

converting the 3D model into a mesh model including a plurality of pixels that define the pile of material; and determining the at least one individual force vector (Wx) corresponding to one or more pixels among the plurality of pixels.

17. The computer program product of claim 15, wherein the unbalance prediction module is in signal communication with at least one robotic system, wherein the at least one corrective action includes rearranging the pile of material to remove the at least one void space, and wherein the unbalanced prediction module generates a control signal to control the at least one robotic system to perform the at least one corrective action.

18. The computer program product of claim 17, wherein rearranging the pile of material includes rearranging a most recent deposited layer of material to remove the at least one void.

19. The computer program product of claim 15, wherein determining the at least one force vector includes calculating a resisting force (R) and a driving force (S), and determining the unbalanced state includes comparing the resisting force (R) to the driving force (S).

20. The computer program product of claim 19, wherein the unbalanced state is determined in response to the resisting force (R) is less than the driving force (S).

* * * * *